(12) United States Patent
Fernandez Astudillo et al.

(10) Patent No.: US 12,639,554 B2
(45) Date of Patent: May 26, 2026

(54) COMBINING GENERATIVE ALIGNERS AND TRANSITION-BASED PARSERS

(71) Applicants: International Business Machines Corporation, Armonk, NY (US); Massachusetts Institute Of Technology, Cambridge, MA (US)

(72) Inventors: Ramon Fernandez Astudillo, White Plains, NY (US); Andrew Drozdov, New York, NY (US); Jiawei Zhou, Cambridge, MA (US); Radu Florian, Danbury, CT (US); Tahira Naseem, Briarcliff Manor, NY (US); Yoon Hyung Kim, Cambridge, MA (US)

(73) Assignees: INTERNATIONAL BUSINESS MACHINES CORPORATION, Armonk, NY (US); Massachusetts Institute Of Technology, Cambridge, MA (US)

( * ) Notice: Subject to any disclaimer, the term of this patent is extended or adjusted under 35 U.S.C. 154(b) by 611 days.

(21) Appl. No.: 18/308,167

(22) Filed: Apr. 27, 2023

(65) Prior Publication Data

US 2024/0362466 A1     Oct. 31, 2024

(51) Int. Cl.
  *G06N 3/0475*     (2023.01)
  *G06N 3/047*     (2023.01)
  *G06N 5/045*     (2023.01)

(52) U.S. Cl.
  CPC .......... *G06N 3/0475* (2023.01); *G06N 3/047* (2023.01); *G06N 5/045* (2013.01)

(58) Field of Classification Search
  CPC ....... G06N 3/0475; G06N 3/047; G06N 5/045
  See application file for complete search history.

(56) References Cited

U.S. PATENT DOCUMENTS

| | | | |
|---|---|---|---|
| 8,874,434 B2 | 10/2014 | Collobert et al. | |
| 9,536,522 B1 | 1/2017 | Hall et al. | |
| 10,876,847 B2 * | 12/2020 | Wang ..................... | G06N 3/088 |

(Continued)

OTHER PUBLICATIONS

Structure-aware Fine-tuning of Sequence-to-sequence Transformers for Transition-based AMR Parsing Jiawei Zhou Tahira Naseem RamónFernandezAstudillo Young-Suk Lee Radu Florian.*

(Continued)

*Primary Examiner* — David E Choi
(74) *Attorney, Agent, or Firm* — Amin, Turocy & Watson, LLP

(57) ABSTRACT

Systems, computer-implemented methods, and computer program products to facilitate reducing error propagation when combining generative aligners and transition-based aligners are provided. According to an embodiment, a system can comprise a processor that executed components stored in memory. The computer executable components comprise a generative alignment component, an error propagation component, a discriminative parser, and a stochastic oracle policy component. The error propagation component can compute a posterior distribution over one or more hard alignments of parts given a pair of the generative alignment component. The discriminative parser can be trained via the stochastic oracle policy component to reduce error propagation when combining the generative alignment component with the discriminative parser.

20 Claims, 6 Drawing Sheets

(56) References Cited

U.S. PATENT DOCUMENTS

| | | | |
|---|---|---|---|
| 10,878,188 B2 | 12/2020 | Zhang et al. | |
| 11,238,095 B1 | 2/2022 | Burchard | |
| 11,314,989 B2 * | 4/2022 | Munoz Delgado | G06N 3/084 |
| 11,481,637 B2 * | 10/2022 | Malaya | G06N 3/094 |
| 11,551,337 B2 * | 1/2023 | Tagra | G06T 5/50 |
| 2004/0243568 A1 | 12/2004 | Wang et al. | |
| 2006/0277028 A1 | 12/2006 | Chen et al. | |
| 2019/0188603 A1 * | 6/2019 | Cirit | G06N 3/047 |
| 2020/0082250 A1 * | 3/2020 | Guan | G06F 17/18 |
| 2021/0056429 A1 * | 2/2021 | Gangeh | G06V 10/82 |
| 2021/0073630 A1 * | 3/2021 | Zhang | G06N 3/08 |
| 2021/0103807 A1 * | 4/2021 | Baker | G06N 3/0985 |
| 2021/0319240 A1 * | 10/2021 | Demir | G06N 3/044 |
| 2022/0083837 A1 | 3/2022 | Hashimoto et al. | |
| 2022/0086174 A1 * | 3/2022 | Helmsen | H04L 63/1416 |
| 2022/0114473 A1 | 4/2022 | Awasthy et al. | |
| 2022/0245431 A1 * | 8/2022 | Mehr | G06T 19/20 |
| 2022/0253687 A1 * | 8/2022 | Miyaguchi | G06N 3/0475 |
| 2022/0366264 A1 * | 11/2022 | Moradi | G06N 3/0442 |
| 2022/0414430 A1 * | 12/2022 | Li | G06N 3/08 |
| 2023/0009814 A1 * | 1/2023 | Hao | G06Q 30/0631 |
| 2023/0128579 A1 * | 4/2023 | Resnick | G06Q 30/0202 |
| | | | 706/21 |
| 2023/0281429 A1 * | 9/2023 | Bandyopadhyay | G06F 18/217 |
| | | | 706/15 |
| 2023/0401469 A1 * | 12/2023 | Papadopoulos | G06N 20/00 |
| 2024/0362466 A1 * | 10/2024 | Fernandez Astudillo | |
| | | | G06N 3/047 |
| 2025/0045631 A1 * | 2/2025 | Solmaz | G06N 20/20 |
| 2025/0225401 A1 * | 7/2025 | Durvasula | G06N 3/0475 |
| 2025/0278643 A1 * | 9/2025 | Doshi | G06N 5/022 |
| 2025/0322917 A1 * | 10/2025 | Bengio | G16C 20/50 |

OTHER PUBLICATIONS

Drozdov, et al., "Inducing and Using Alignments for Transition-based AMR Parsing," arXiv:2205.01464v1 [cs.CL] May 3, 2022.

* cited by examiner

100

| | |
|---|---|
| 102<br>GENERATIVE<br>ALIGNMENT<br>COMPONENT | 104<br>ERROR<br>PROPAGATION<br>COMPONENT |
| 106<br>DSICRIMINATIVE<br>PARSER | 108<br>STOCHASTIC<br>ORACLE POLICY<br>COMPONENT |
| | 110<br>SCALING<br>COMPONENT |

120
SYSTEM BUS

122
PROCESSOR

124
MEMORY/
STORAGE

130
NETWORK(S)

134
COMPUTER
APPLICATION(S)

132
INPUT DEVICE(S)

( correlate-91 :ARG1 ( more ;ARG3-of
    ( have-degree-91 :ARG1 ) come-01 :ARG1
    ( they ) :manner ( hard ) ) ) ) :ARG2
    ( more :ARG3-of ( have-degree-91 :ARG1
    ( fall-01 :manner ( hard ) ) ) ) ) )

500 ⌐

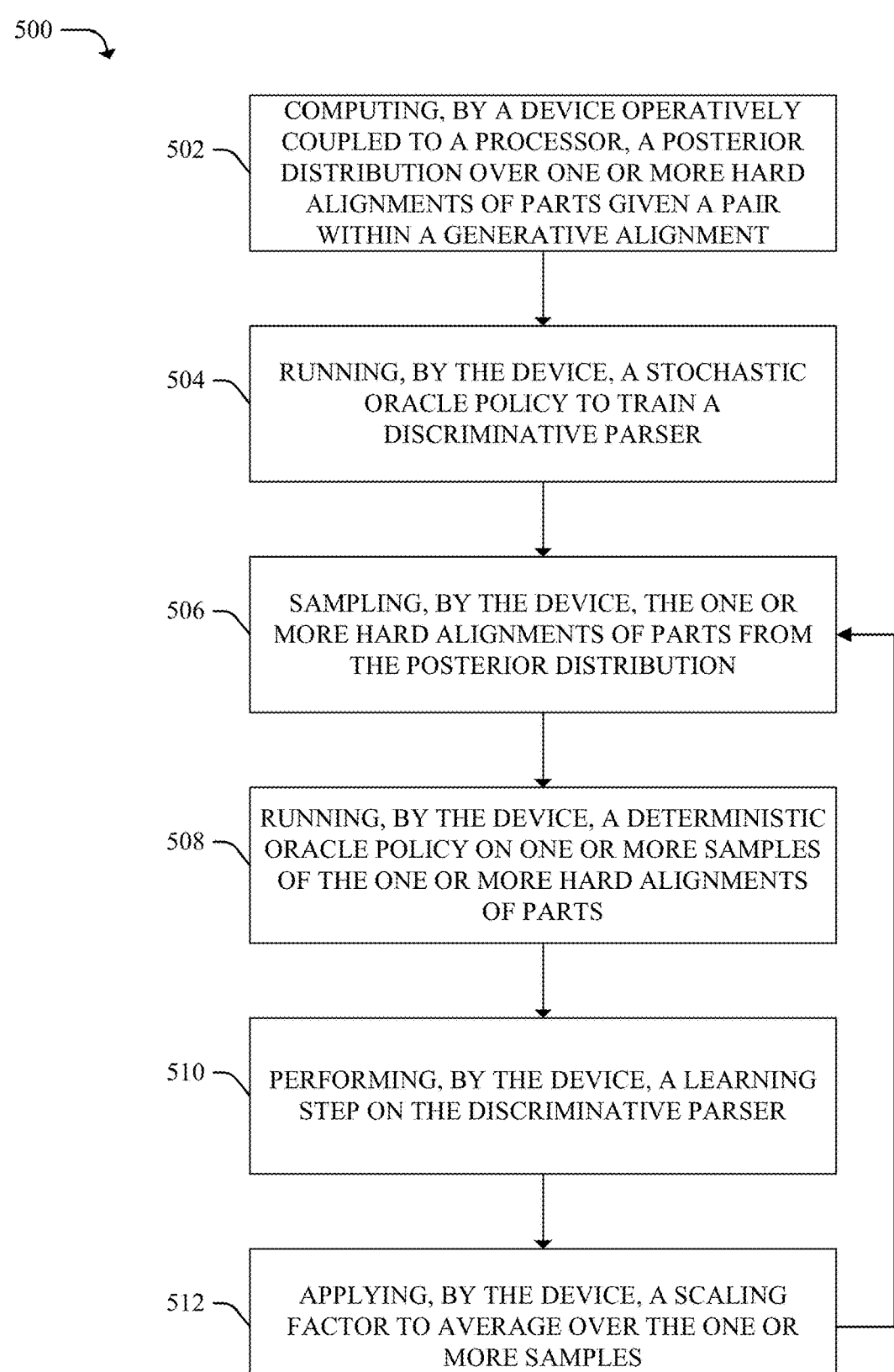

502 ⌐ COMPUTING, BY A DEVICE OPERATIVELY COUPLED TO A PROCESSOR, A POSTERIOR DISTRIBUTION OVER ONE OR MORE HARD ALIGNMENTS OF PARTS GIVEN A PAIR WITHIN A GENERATIVE ALIGNMENT

504 ⌐ RUNNING, BY THE DEVICE, A STOCHASTIC ORACLE POLICY TO TRAIN A DISCRIMINATIVE PARSER

506 ⌐ SAMPLING, BY THE DEVICE, THE ONE OR MORE HARD ALIGNMENTS OF PARTS FROM THE POSTERIOR DISTRIBUTION

508 ⌐ RUNNING, BY THE DEVICE, A DETERMINISTIC ORACLE POLICY ON ONE OR MORE SAMPLES OF THE ONE OR MORE HARD ALIGNMENTS OF PARTS

510 ⌐ PERFORMING, BY THE DEVICE, A LEARNING STEP ON THE DISCRIMINATIVE PARSER

512 ⌐ APPLYING, BY THE DEVICE, A SCALING FACTOR TO AVERAGE OVER THE ONE OR MORE SAMPLES

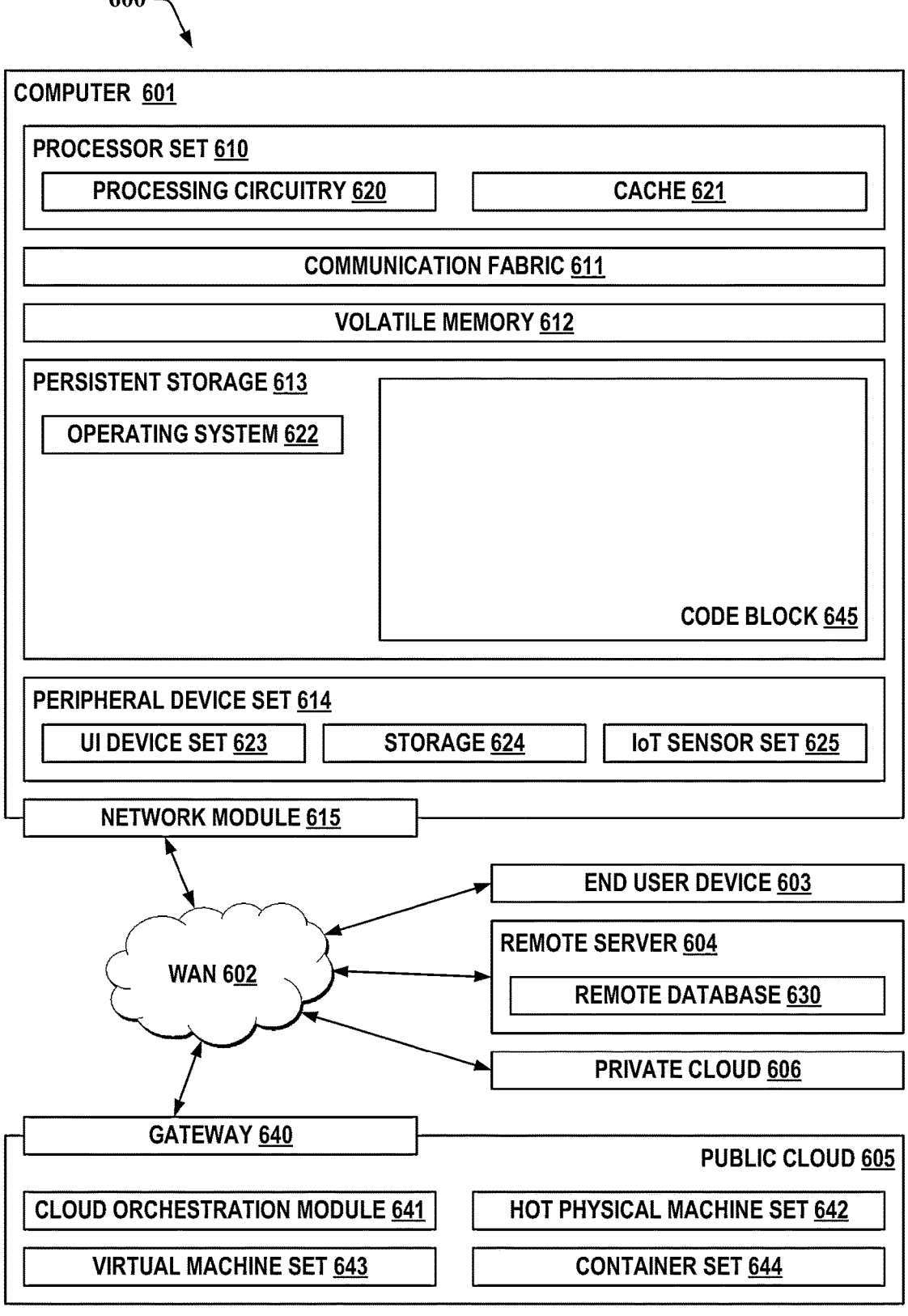

COMPUTER 601

PROCESSOR SET 610

PROCESSING CIRCUITRY 620

CACHE 621

COMMUNICATION FABRIC 611

VOLATILE MEMORY 612

PERSISTENT STORAGE 613

OPERATING SYSTEM 622

CODE BLOCK 645

PERIPHERAL DEVICE SET 614

UI DEVICE SET 623

STORAGE 624

IoT SENSOR SET 625

NETWORK MODULE 615

WAN 602

END USER DEVICE 603

REMOTE SERVER 604

REMOTE DATABASE 630

PRIVATE CLOUD 606

GATEWAY 640

PUBLIC CLOUD 605

CLOUD ORCHESTRATION MODULE 641

HOT PHYSICAL MACHINE SET 642

VIRTUAL MACHINE SET 643

CONTAINER SET 644

FIG. 6

COMBINING GENERATIVE ALIGNERS AND TRANSITION-BASED PARSERS

STATEMENT REGARDING PRIOR DISCLOSURES BY THE INVENTOR OR A JOINT INVENTOR

The following disclosure is submitted under 35 U.S.C. 102(b)(1)(A):

DISCLOSURE: [Supplemental material: Inducing and Using Alignments for Transition-based AMR Parsing, Andrew Drozdov, Jiawei Zhou, Radu Florian, Andrew McCallum, Tahira Naseem, Yoon Kim, Ramon Fernandez Astudillo, May 3, 2022, 1-13].

BACKGROUND

When using a stage of generative alignment to produce data for training a discriminative transition-based parser, error can propagate from inaccuracies on generative alignment to the parser training stage, causing the parser to be less robust. Such inaccuracies can lead to over-fitting to bad alignments. The present disclosure relates to spoken language understanding, and more specifically, to techniques for propagating the uncertainty of the generative stage to the parser training stage using a stochastic oracle policy.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate reducing error propagation when combining generative aligners and transition based aligners are provided.

According to an embodiment, a system can comprise a processor that executes computer executable components stored in memory. The computer executable components comprise a generative alignment component and an error propagation component that can compute a posterior distribution over one or more hard alignments of parts given a pair of the generative alignment component.

According to an embodiment, the computer executable components can comprise a discriminative parser trained via a stochastic oracle policy component to reduce error propagation when combining the generative alignment component with the discriminate parser. Further, in embodiments, the stochastic oracle policy component can perform a learning step on the discriminative parser over one or more epochs. With embodiments, the learning step can comprise learning via gradient descent over one or more epochs.

According to another embodiment, the computer executable components can further comprise a scaling component that can apply a scaling factor to average over the one or more samples. With embodiments, the discriminative parser can be exposed to one or more explanatory models. Additionally, the discriminate parser and the generative alignment component can be end-to-end systems.

An advantage of the above-indicated system can be mitigating the propagation of errors from the aligner training into the parser training. Further, another advantage of the system can be to propagate the uncertainty of the generative stage to the parser training stage.

An additional advantage of the above-indicated system can be that the system provides a regularization effect that prevents overfitting to bad alignments. Further, an advantage of the system can be that the parser is exposed to multiple explanatory models which can assist the model in ignoring bad/improper explanations caused by poorly generalizing rule-based components of the oracle.

According to another embodiment, a computer-implemented method for reducing error propagation when combining generative aligners and transition-based aligners can comprise computing, by a device operatively coupled to a processor, a posterior distribution over one or more hard alignment of parts given a pair within a generative alignment. The computer-implemented method can additionally comprise running, by the device, a stochastic oracle policy to train a discriminative parser. The computer-implemented method can further comprise sampling, by the device, the one or more hard alignments of parts from the posterior distribution. In embodiments, the computer-implemented method can comprise running, by the device, a deterministic oracle policy on one or more samples of the one or more hard alignments of parts. Additionally, the computer-implemented method can comprise performing, by the device, a learning step on the discriminative parser. In embodiments, the computer-implemented method can comprise applying, by the deice, a scaling factor to average over the one or more samples.

According to an embodiment, the computer-implemented method can comprise incorporating an uncertainty of the one or more hard alignments of parts into training the discriminative parser. Additionally, the computer-implemented method can comprise exposing the discriminative parser to one or more explanatory models.

According to another embodiment, running the stochastic oracle policy can prevent over-fitting the discriminate parser to bad alignments. Further, in embodiments, the learning step can be performed via gradient descent. Additionally, the computer-implemented method can comprise transferring embedding-level knowledge from the generative alignment into speech embeddings. With embodiments, the pair can include a natural language portion and a formal representation portion associated with an input sequence.

An advantage of the above-indicated computer-implemented method can be mitigating the propagation of errors from the aligner training into the parser training. Further, another advantage of the system can be to propagate the uncertainty of the generative stage to the parser training stage.

An additional advantage of the above-indicated computer-implemented method can be that the system provides a regularization effect that prevents overfitting to bad alignments. Further, an advantage of the computer-implemented method can be that the parser is exposed to multiple explanatory models which can assist the model in ignoring bad/improper explanations caused by poorly generalizing rule-based components of the oracle.

According to another embodiment, a computer program product for reducing error propagation when combining generative aligners and transition-based aligners, the computer program product comprising a non-transitory computer readable storage memory having program instructions embodied therewith, the program instructions executable by a processor to cause the processor to compute a posterior distribution over one or more hard alignments of parts give a pair within a generative alignment. The computer program product can additionally cause the processor to run a stochastic oracle policy to train a discriminative parser, wherein an uncertainty of alignment of the generative alignment is incorporated into training the discriminative parser.

According to an embodiment, the program instructions can cause the processor to sample the one or more hard alignments of parts from the posterior distribution; run a deterministic oracle policy on one or more samples of the one or more hard alignments of parts; perform a learning step on the discriminative parser; and apply a scaling factor to average over the one or more samples.

According to another embodiment, the program instructions can cause the processor to expose the discriminate parser to one or more explanatory models. With embodiments, the program instructions can cause the processor to prevent over-fitting of the discriminative parser to bad alignments via the stochastic oracle policy. Additionally, the program instructions can cause the processor to perform the learning step via a gradient descent, and can cause the processor to transfer embedding-level knowledge from the generative alignment into speech embeddings.

An advantage of the above-indicated computer program product can be mitigating the propagation of errors from the aligner training into the parser training. Further, another advantage of the computer program product can be to propagate the uncertainty of the generative stage to the parser training stage.

An additional advantage of the above-indicated computer program product can be that the system provides a regularization effect that prevents overfitting to bad alignments. Further, an advantage of the computer program product can be that the parser is exposed to multiple explanatory models which can assist the model in ignoring bad/improper explanations caused by poorly generalizing rule-based components of the oracle.

DESCRIPTION OF THE DRAWINGS

FIG. 5 illustrates a flow diagram of an example, non-limiting method that can facilitate mitigating the propagation of errors from the aligner training into parser training in accordance with one or more embodiments described herein.

FIG. 6 illustrates a block diagram of an example, non-limiting operating environment in which one or more embodiments described herein can be facilitated.

DETAILED DESCRIPTION

Figure 1:
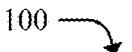
FIG. 1 illustrates a block diagram of an example, non-limiting system that can facilitate mitigating the propagation of errors from the aligner training into parser training in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Generally, Abstract Meaning Representation (AMR) can be used as an effort to unify various semantic tasks such as entity-typing, co-reference, relation extraction, and etc. Of existing approaches for AMR parsing, transition-based parsing is notable for high performance while relying on node-to-word alignments as a core pre-processing step. Such alignments are not in the training data and can be learned separately via a complex pipeline of rule-based systems, pre-processing (e.g., lemmatization), and post-processing to satisfy domain-specific constraints. Such pipelines can fail to generalize well, thus propagating errors into training that reduce AMR performance in new domains. Further, alignments can be probabilistically induced and can be used for transition-based AMR parsing in a domain-agnostic manner, which can replace the existing heuristics-based pipeline.

Given problems described above with existing AMR technologies, the present disclosure can be implemented to produce a solution to these problems in the form of systems, computer-implemented methods, and/or computer program products that can facilitate mitigating the propagation of errors from the aligner training into the parser training by: training the AMR parser on oracle actions derived samples from the neural aligner's (e.g., the generative aligner or generative alignment component 102) posterior distribution. The neural aligner can be used as an importance sampling distribution, which can be used to better approximate samples from the AMR parser's posterior alignment distribution, and thus can better approximate the otherwise intractable log marginal likelihood.

An advantage of the above-indicated system can be a simplified pipeline that can learn state-of-the-art AMR parsers that perform well on both AMR2.0 and AMR3.0. AMR parsers learned in this manner do not require beam search and hence can be more efficient at test time. Additionally, another advantage of the above-indicated system can be to transfer strong inductive biases from the aligner (e.g., the constrained aligner) to the parser (e.g., the overly flexible parser).

Given these problems, one or more embodiments described herein can be implemented to produce a solution to one or more of these problems in the form of systems, computer-implemented methods, and/or computer program products that can facilitate the following processes: i) computing a posterior distribution over one or more hard alignments of parts given a pair within a generative alignment; ii) running a deterministic oracle policy on the one or more samples of the one or more hard alignments of parts; iii) sampling the one or more hard alignments of parts from the posterior distribution; iv) running a deterministic oracle policy on one or more samples of the one or more hard alignments of parts; v) performing a learning step on the discriminative parser; and vi) applying a scaling factor to average over the one or more samples. That is, embodiments described herein include one or more systems, computer implemented methods, apparatuses and/or computer program products that can facilitate one or more of the aforementioned processes.

FIG. 1 illustrates a block diagram of an example, non-limiting error mitigation system 100 that comprises a generative alignment component 102 (e.g., an end-to-end system), an error propagation component 104, a discriminative parser 106 (e.g., an end-to-end system), a stochastic oracle policy component 108, and a scaling component 110. Additionally, the error propagation component 104 can compute a posterior distribution over one or more hard alignments of parts given a pair of the generative alignment component 102. Repetitive description of like elements employed in other embodiments described herein is omitted for sake of brevity. Aspects of systems (e.g., the error mitigation system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, a combination thereof, and/or the like) can cause the machines to perform the operations described.

Additional description of functionalities will be further described below with reference to the example embodiments of FIG. 1, where repetitive description of like elements and/or processes employed in respective embodiments is omitted for sake of brevity. The error mitigation system 100 can facilitate: i) computing a posterior distribution over one or more hard alignments of parts given a pair within a generative alignment; ii) running a deterministic oracle policy on the one or more samples of the one or more hard alignments of parts; iii) sampling the one or more hard alignments of parts from the posterior distribution; iv) running a deterministic oracle policy on one or more samples of the one or more hard alignments of parts; v) performing a learning step on the discriminative parser; and vi) applying a scaling factor to average over the one or more samples. The generative alignment component 102, the error propagation component 104, the discriminative parser 106, the stochastic oracle policy component 108, and scaling component 110 can be associated with a computing environment 600 (FIG. 6).

Discussion first turns briefly to system bus 120, processor 122, and memory 124 of error mitigation system 100. For example, in one or more embodiments, the error mitigation system 100 can comprise processor 122 (e.g., computer processing unit, microprocessor, classical processor, and/or like processor). In one or more embodiments, a component associated with error mitigation system 100, as described herein with or without reference to the one or more figures of the one or more embodiments, can comprise one or more computer and/or machine readable, writable and/or executable components and/or instructions that can be executed by processor 122 to enable performance of one or more processes defined by such component(s) and/or instruction(s).

In one or more embodiments, error mitigation system 100 can comprise a computer-readable memory (e.g., memory 124) that can be operably connected to the processor 122. Memory 124 can store computer-executable instructions that, upon execution by processor 122, can cause processor 122 and/or one or more other components of the error mitigation system 100 (e.g., generative alignment component 102, error propagation component 104, discriminative parser 106, stochastic oracle policy component 108, and scaling component 110) to perform one or more actions. In one or more embodiments, memory 124 can store computer-executable components (e.g., generative alignment component 102, error propagation component 104, discriminative parser 106, stochastic oracle policy component 108, and scaling component 110).

With embodiments, error mitigation system 100 and/or a component thereof as described herein, can be communicatively, electrically, operatively, optically and/or otherwise coupled to one another via bus 120. Bus 120 can comprise one or more of a memory bus, memory controller, peripheral bus, external bus, local bus, and/or another type of bus that can employ one or more bus architectures. One or more of these examples of bus 120 can be employed. In one or more embodiments, the error mitigation system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of the error mitigation system 100 can reside in the cloud, and/or can reside locally in a local computing environment (e.g., at a specified location(s)). In examples, the error mitigation system 100 can be connected with the bus 120, one or more input devices 132, and one or more computer applications 134, which can be associated with cloud computing environment 600 (FIG. 6).

In addition to the processor 122 and/or memory 124 described above, the error mitigation system 100 can comprise one or more computer and/or machine readable, writable and/or executable components and/or instructions that, when executed by processor 122, can enable performance of one or more operations defined by such component(s) and/or instruction(s). The error mitigation system 100 can be associated with, such as accessible via, a computing environment 600 described below with reference to FIG. 6. For example, error mitigation system 100 can be associated with a computing environment 600 such that aspects of processing can be distributed between the error mitigation system 100 and the computing environment 600.

Figure 2:
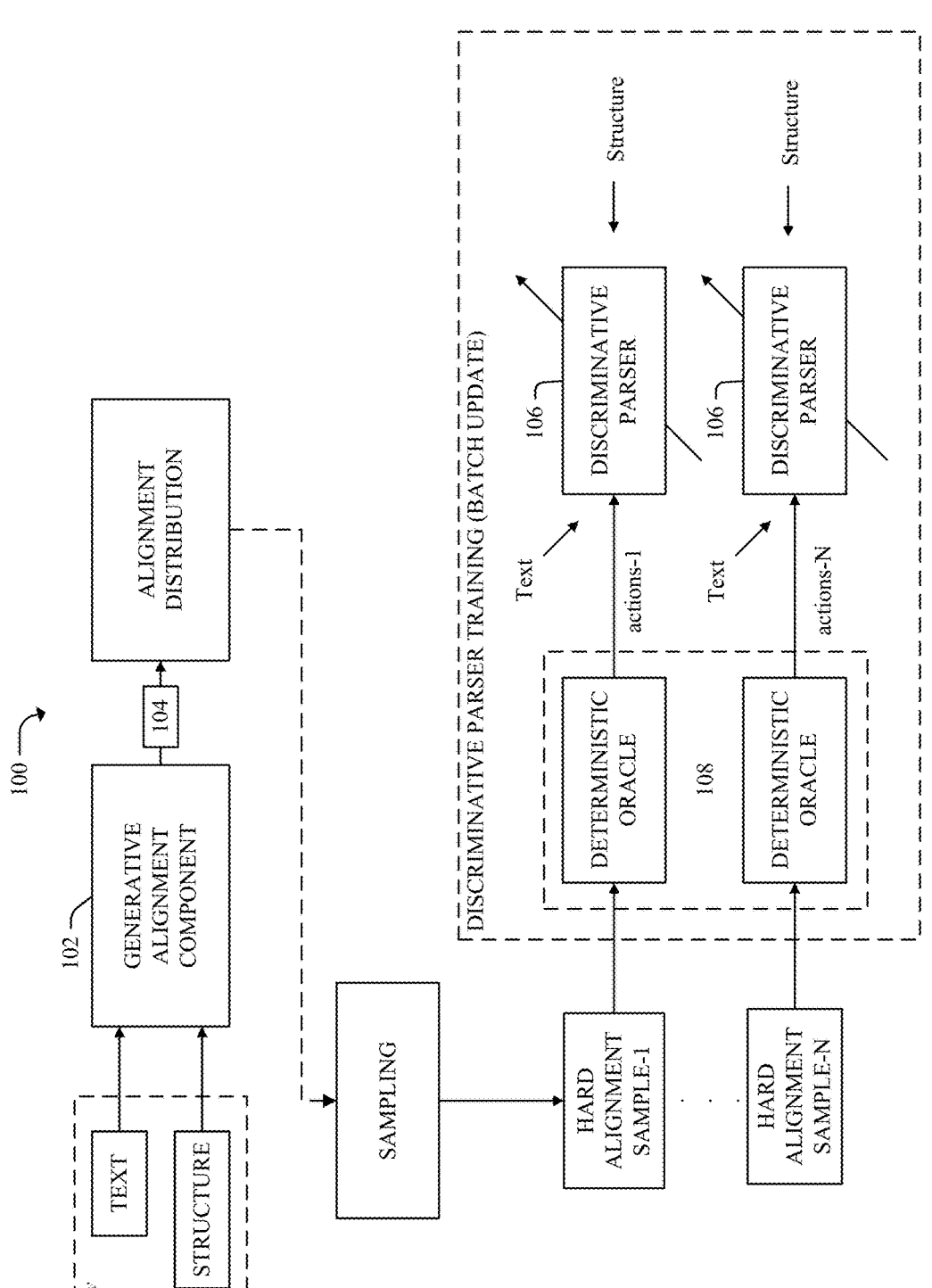
FIG. 2 illustrates a block diagram of an example, non-limiting method that can facilitate mitigating the propagation of errors from the aligner training into parser training in accordance with one or more embodiments described herein.
Figure 3:
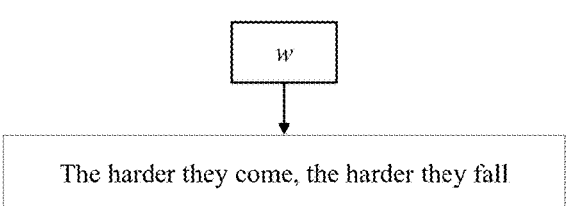
FIG. 3 illustrates a block diagram of an example, non-limiting system that can facilitate mitigating the propagation of errors from the aligner training into parser training in accordance with one or more embodiments described herein.
Figure 3:
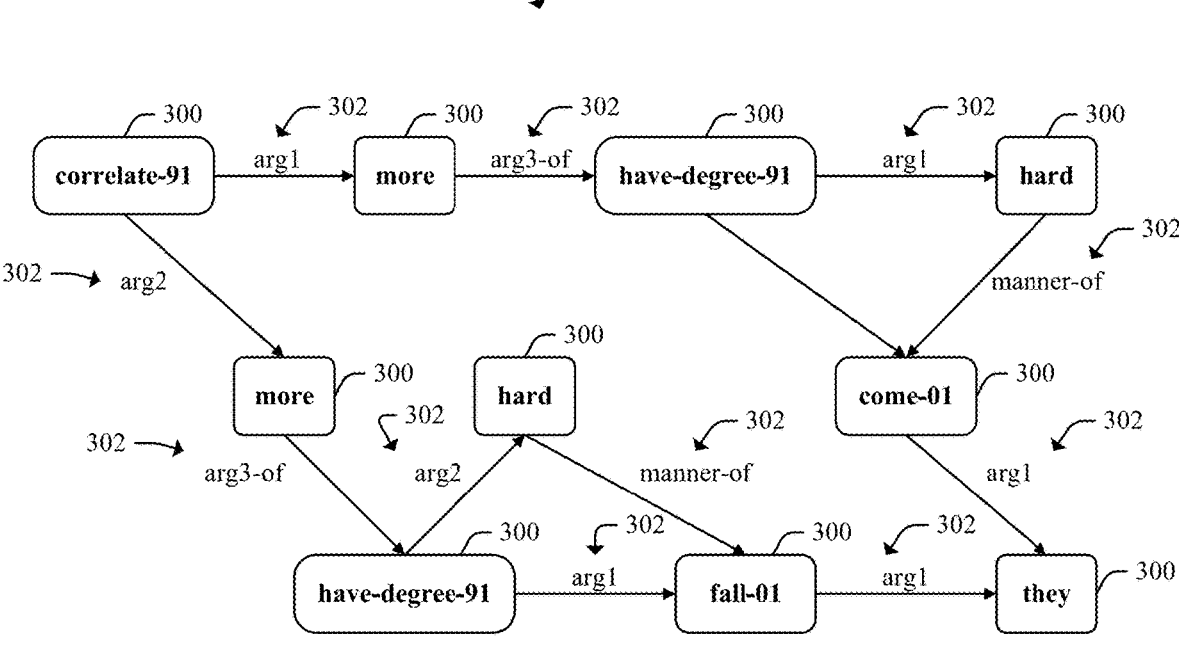
Figure 3:
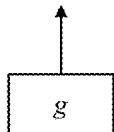

With embodiments, such as generally illustrated by FIGS. 1 and 2, an effective way to train AMR parsers can be with sequence-to-sequence learning where the input sequence can be the sentence w (e.g., see FIG. 3) and the output sequence can be a graph g (see, e.g., FIG. 3) decomposed into an action sequence a via an oracle (e.g., the stochastic oracle policy component 108). An example input sentence w is illustrated in FIG. 3, that includes the phrase "The harder they come, the harder they fall." The combination of words (e.g., text) and actions (e.g., structure) can be provided to a parameter-less state machine M that can produce the graph $g:=M(w, a)$. The state machine can perform the oracle inverse operation O when also provided alignments I, mapping a graph to a deterministic sequence of oracle actions $a:=O(l, w, g)$. During training, the model can learn to map $w \rightarrow a$ (e.g., these pairs are given by the oracle O) and M can be used to construct graphs ($a \rightarrow g$) for evaluation.

In embodiments, such as generally illustrated in FIG. 2, the system 100 can comprise the alignment model (e.g., generative alignment component 102) which can be trained to maximize the probability of the formal representation given the input natural language sentence w. The sentence w can include a natural language pairs that can be split into text and structure portions. Further, the alignment distribution can be strongly factored for tractable learning and can omit elements of the formal language that are not explicitly elated to the natural language. For example, the formal representation can be a graph g where word-node pairs and the alignment distribution can be defined to align the word in the input to one or more possible nodes. The graph g can include edges (e.g., see FIG. 3) that need not be aligned if such edges cannot be clearly related to surface symbols. Additionally, training of the alignment distribution can result in the identification of a number of frequent parts and in turn alignments between parts of the natural language and the formal representation. The sentence w can be processed left-to-right as a set of tokens; and, for each node 300, aligned nodes can be generated, as well as arcs 302 between current generated nodes and past generated nodes when applicable (which can be determined by an expert or obtained via combinational search).

With embodiments, given each training pair (e.g., natural language, formal representation) the hard alignment of parts (alignment sample-1 . . . sample-N) can be extracted from the alignment distribution, such as illustrated in FIG. 2. A deterministic oracle policy can be applied, via the stochastic oracle policy component 108, to the pair (e.g., the text and structure pair/natural language and structure pair) and the hard alignment of parts, providing a set of actions that transform the natural language sentence w into the formal representation.

In embodiments, the oracle and the state machine from StructBART can be used. The oracle and the state machine can rely on rules that can determine which actions are valid (e.g., the first action may not be to generate an edge). Further, the actions can be the output space that the parser predicts, and when read from left-to-right can be used to construct an AMR graph (e.g., such as illustrated by g in FIG. 3). The actions can incorporate alignments.

With embodiments, the following rules can define the valid actions at each time step: i) maintain a cursor that reads the sentence left-to-right and progressing for SHIFT action; ii) at each cursor position, generate any nodes aligned to the cursor's word (e.g., node-word alignments can be used); and iii) immediately after generated a node, also generate any valid incoming or outgoing arcs. Further, in additional embodiments, the following actions can be performed at each time step: i) SHIFT: Increment the cursor position; ii) NODE($y_v$): Generate node with label $y_v$; iii) COPY: Generate a node by copying the word under the cursor as the label; iv) LA($y_e$, n), RA(($y_e$, n): Generate an edge with label $y_e$ from the most recently generated node to the previously generated node n. LA and RA (e.g., left-arc and right-arc) can indicate the edge direction as outgoing/incoming. $y_e$ can be used to different edge labels from node labels $y_v$; and v) END: a special action that can indicate that the full graph has been generated.

In additional embodiments, for parsing, StructBART can fine-tune (Bidirectional and Auto-Regressive Transformer) BART with the following modifications: i) StructBART can convert an attention head from a BART decoder into a pointer network for predicting n in the LA/RA actions; ii) logits for actions can be masked to guarantee graph well-formedness; and iii) alignment can be used to mask two cross-attention heads of the BART decoder, thereby integrating structural alignment directly in the model. Further, StructBART can be trained to optimize the maximum likelihood of action sequences given sentence and alignment. Moreover, for a single example (w, g, l)~D, a:=O(l, w, g), the log-likelihood of the actions (and the associate graph) can be given by, $$\log p(a|w; \theta) = \sum_{t=1}^{T} \log p(a_t|a_{t<1}, w; \theta)$$

for a model with parameters $\theta$. Probabilities of actions that create arcs can be decomposed into independent label and pointer distributions:

$$p(a_t|a_{t<1}, w; \theta) = p(y_e|a_{t<1}, w; \theta)p(n|a_{t<1}, w; \theta),$$

$$p(y_e|a_{t<1}, w; \theta)p(n|a_{t<1}, w; \theta)$$

p ($y_e$ |$a_t$<$_1$, w; $\theta$)p(n|$a_{t<1}$, w; $\theta$) where can be computed with the normal output vocabulary distribution of BART and with an attention head of the decoder.

With embodiments, for training, StructBART depends on node-to-word AMR alignment l to specify the oracle actions. The steps in SB-Align can comprise: i) producing initial alignment using Symmetrized Expectation Maximization; ii) attempting to align additional nodes by inheriting child node alignments; and iii) continuing to re-fine alignments using JAMR which involves constraint optimization using a set of linguistically motivated rules. The StructBART action space can that all nodes are aligned, however, after running SB-Align some node may not be. This can be resolved by first "force aligning" unaligned nodes to unaligned tokes, then propagating alignments from child-to-parent nodes and vice versa until all nodes are aligned to text spans. Node-to-span alignments can be converted into node-to-token alignments for model training (e.g., by deterministically aligning to the first node of an entity).

Figures 4A, 4B:
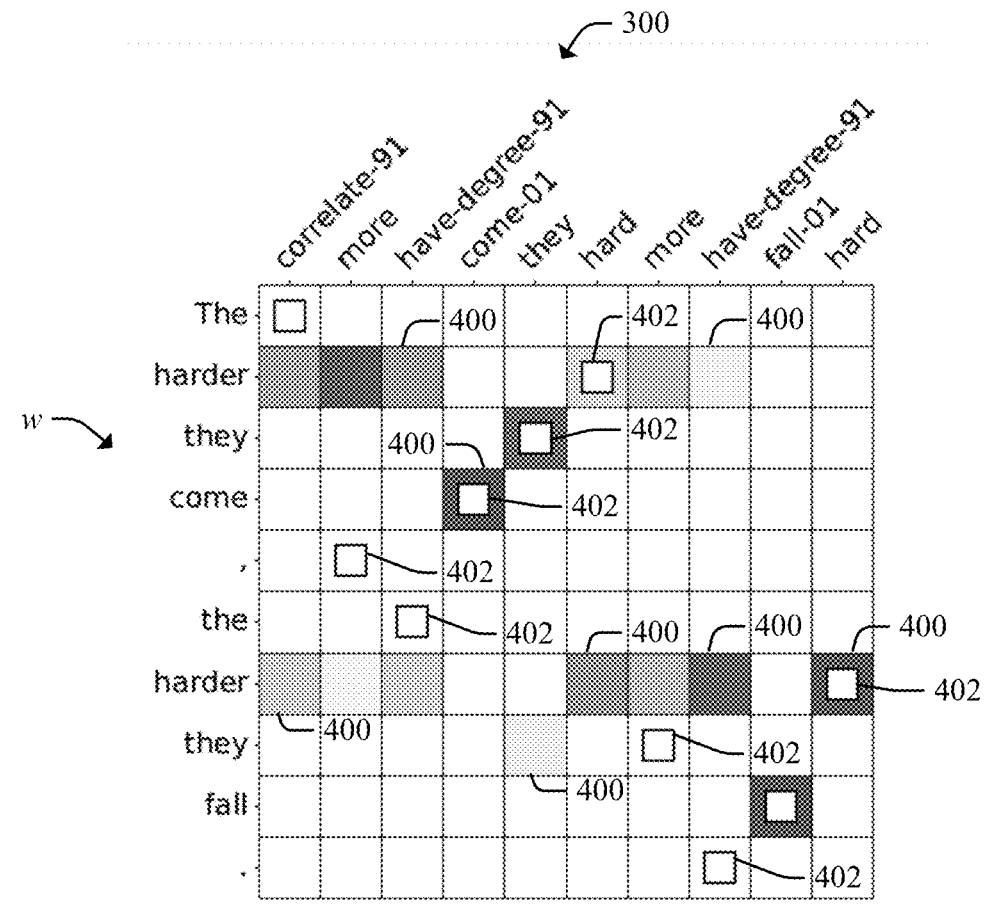
FIG. 4A illustrates a block diagram of an example, non-limiting system that can generate a linearized AMR tree in accordance with one or more embodiments described herein.
FIG. 4B illustrates a block diagram of an example, non-limiting system that can generate a visualization for alignment posterior and point estimate in accordance with one or more embodiments described herein.

In embodiments, the neural aligner (e.g., the generative alignment component 102) can be a variant of sequence-to-sequence models with hard attention. In contrast to SB-Align, the error mitigation system 100 can include minimal pre-processing and does not include dependencies on many components or domain-specific rules. The alignment model (e.g., the generative alignment component 102) can be trained separately from the AMR parser and can optimize the conditional likelihood of nodes in the linearized graph given the sentence w. Such as generally illustrated in FIG. 4A, the AMR graph can be linearized by first converting the graph into a tree (e.g., comprising nodes 200 and edges 202) and then linearizing the tree via a depth-first search. Further, the generative alignment component 102 can incur a loss for nodes 200 (e.g., as indicated in bold font in FIG. 3 and FIG. 4A). As seen in FIG. 4B, the shaded regions represent the alignment posterior 400, and the squares represent a point estimate from the baseline 402, which corresponds to the most probable value of each distribution over tokens. Letting v=$v_1$, . . . , $v_s$ be the nodes in the linearized graph, the log-likelihood can be given by:

$$\log q(v|w; \varphi) = \sum_{s=1}^{s} \log q(v_s|v_{<s}, w; \varphi)$$

where we use $v_{<s}$ to indicate all the tokens (e.g., including brackets and edges) before $v_s$. That is, we can incur losses only on the nodes vs, but still can represent the entire history $v_{<s}$ for the prediction. The probability of each node 300 can be given by marginalizing over latent alignments $l_s$, $$q(v_s \mid v_{<s}, w; \varphi) = \sum_{i=1}^{|w|} q(l_s = i \mid v_{<s}, w; \varphi) x q(v_s \mid l_s = i, v_{<s}, w; \varphi)$$

where $l_s=i$ indicates that node $v_s$ can be aligned to word $w_i$. For parameterization, the sentence w can be encoded by a bi-directional LSTM. Words can be represented using a word embedding derived from a pre-trained character-encoder from ELMo, which can be frozen during training. As illustrated in FIG. 4B, the linearized AMR tree can be transformed into a visualization of the alignment posterior and point estimates from the baseline. One the decoder side, the linearized AMR tree history can be represented by a uni-directional LSTM. The decoder can share word embeddings with the text encoder. The prior alignment probability $q(l_s=i\mid v_{<s}, w; \varphi)$ can be given by bilinear attention:

$$q(l_s = i \mid v_{<s}, w; \varphi) = \frac{\exp(\alpha_{s,i})}{\sum_{j=1}^{|w|} \exp(\alpha_{s,j})}$$

$$\alpha_{s,i} = h_s^{(v)T} W h_i^{(w)},$$

where W can be a learned matrix, $h_i^{(W)}$ can be a concatenation of forward and backward LSTM vectors for the i-th word in the text encoder, and $h_t^{(v)}$ can be a vector immediately before the s-th node in the graph decoder. The likelihood $q(v_s\mid l_s=i, v_{<s}, w; \varphi)$ can be formulated as a softmax layer with the relevant vectors concatenated as input, $$q(v_s = y \mid l_s = i, v_{<s}, w; \varphi) = softmax\big(U\big[h_s^{(y)}; h_i^{(w)}\big] + b\big)[y]$$

where the softmax can be over the node vocabulary and can be indexed by the label y belonging to the node vs.

Additionally, once trained, the posterior distribution can be tractably obtained over each alignment $l_s$, $$q(l_s = i \mid w, v; \varphi) = \frac{q(l_s = i \mid v_{<s}, w; \varphi) q(v_s \mid l_s = i, v_{<s}, w; \varphi)}{q(v_s \mid v_{<s}, w; \varphi)}$$

and the full posterior distribution over all alignments $l=l_1, \ldots, l_s$ can be given by $$q(l \mid w, g; \varphi) = \prod_{s=1}^{s} q(l_s \mid w, v; \varphi).$$

With embodiments, as compared to classic count-based alignment models, the neural parametrization can make it easy to utilize pretrained embeddings and also condition on the alignment and emission distribution on richer context. For example and without limitation, the emission distribution $q(v_s l_s, v_{<s}, w; \varphi)$ can condition on the full target history $v_{<s}$ and the source context w, unlike count-based models which typically condition on just the aligned word $w_{l_s}$. The flexible modeling capabilities enabled by the use of neural networks can be useful in obtaining good alignment performance.

In embodiments, the neural aligner (e.g., the generative alignment component 102) can induce a posterior distribution over alignments, q(l|w, g; φ). To use the alignment model, the MAP alignment can be decoded $\hat{l}=\text{argmax}_l q(l|w,$ g; φ) and trained from the actions $\hat{a}=O(\hat{l}, w, g)$. Further, the action sequences derived from MAP alignments do not take into account the uncertainty associated with posterior alignments, which may not be ideal. The AMR parser's posterior can be regularized to be close to the neural aligner's posterior at the distribution level to take the above referenced uncertainty into account.

With embodiments, the action oracle O(l, w, g) can be bijective as a function of l (e.g., keeping w and g fixed), so the transition-based parser p(a|w; θ) induces a joint distribution over alignments and graphs, $$p(l, g \mid w; \theta) \stackrel{def}{=} p(a = O(l, w, g) \mid w; \theta).$$

This joint distribution can further induce a marginal distribution over graphs, $$p(g \mid w; \theta) = \sum_l p(l, g \mid w; \theta);$$

as well as a posterior distribution over alignments, $$p(l \mid w, g; \theta) = \frac{p(l, g \mid w; \theta)}{p(g \mid w; \theta)}$$

In examples, the neural aligner's distribution (e.g., the generative alignment component 102) can be used via a posterior regularized likelihood, $$\mathcal{L}_{PR}(\theta) = \log p(g \mid w; \theta) - KL[q(l \mid w, g; \varphi) \| p(l \mid w, g; \theta)]$$

Further, the parser can be learned such that it gives a high likelihood to the gold graph g given the sentence w but at the same time has a posterior alignment distribution that is close to the neural aligner's posterior. Rearranging terms can yield, $$\mathcal{L}_{PR}(\theta) = \mathbb{E}_{q(l \mid w, g; \varphi)}[\log p(l, g \mid w; \theta)] + \mathbb{H}[q(l \mid w, g; \varphi)]$$

and since the second term is a constant with respect to θ, the gradient with respect to θ can be given by, $$\nabla_\theta \mathcal{L}_{PR}(\theta) = \mathbb{E}_{q(l \mid w, g; \varphi)}[\nabla_\theta \log p(l, g \mid w; \theta)]$$

Additionally, applying gradient-based optimization with Monte Carlo gradient estimators can result in an intuitive scheme including: i) sampling K alignments $l^{(1)}, \ldots, l^{(K)}$ from q(l|w, g; φ); ii) obtaining the corresponding action sequences $a^{(1)}, \ldots, a^{(K)}$ from the oracle; and iii) optimizing the loss with the Monte Carlo gradient estimator:

$$\frac{1}{K} \sum_{k=1}^{K} \nabla_\theta \log p\big(a^{(k)} \mid w, g; \theta\big)$$

The above Monte Carlo gradient estimator can generalize the MAP alignment case. Further, setting q(l|w, g)=1 {=l=1} where l is the MAP alignment (e.g., or an alignment derived from the existing pipeline) recovers the existing baseline.

With embodiments, the posterior regularized likelihood lower bounds the log marginal likelihood $\mathcal{L}(\theta)$=log p(g|w; $\theta$) and can implicitly assume that training against the lower bound results in a model that generalizes better than a model trained against the true log marginal likelihood. Additionally, the neural aligner (e.g., the generative alignment component 102) can be used as a surrogate posterior distribution whose samples can be reweighted (e.g., via the scaling component 110) to reduce the gap between the $\mathcal{L}(\theta)$ and the $\mathcal{L}_{PR}(\theta)$. The product of the neural aligner's posterior can be used to create a joint posterior distribution where K is the number of importance samples:

$$q\left(l^{(1)}, \dots l^{(K)}; \varphi\right) \overset{def}{=} \prod_{k=1}^{K} q\left(l^{(k)} \mid w, g; \varphi\right)$$

Further, a scaling factor (1/K) can be applied, via the scaling component 110, to perform an arithmetic average. The scaling factor can be equal to the number of alignments drawn from the distribution. Thus, the following objective:

$$\mathbb{E}_{q\left(l^{(1)}, \dots l^{(K)}; \varphi\right)} \left[ \log \frac{1}{K} \sum_{k=1}^{K} \frac{p\left(l^{(k)}, g \mid w; \theta\right)}{q\left(l^{(k)}\right) \mid w, g; \varphi} \right]$$

monotonically converges to the log marginal likelihood log p(g|w; $\theta$) as K→∞. A single sample Monte Carlo gradient estimator (e.g., via gradient descent) for the above can be given by:

$$\sum_{k=1}^{K} w^{(k)} \nabla_\theta \log p\left(a^{(k)} \mid w, g; \theta\right)$$

where further provided are the normalized importance weights, which can be performed via a learning step:

$$w^{(k)} = \frac{p\left(a^{(k)} \mid w; \theta\right)/q\left(l^{(k)} \mid w, g; \varphi\right)}{\sum_{j=1}^{K} p\left(a^{(j)} \mid w; \theta\right)/q\left(l^{(j)} \mid w, g; \varphi\right)}$$

Thus, in embodiments, compared to the gradient estimator in the posterior regularized case which equally weights each sample, the importance-weighted objective approximates the true posterior p(l|w, g; $\theta$) by first sampling from a fixed distribution q(l|w, g; $\varphi$ and then reweighing it accordingly.

With embodiments, the error mitigation system 100 differs from the variational approaches in that q can be fixed to the pretrained aligner posterior and it is not optimized further. Moreover, the lower bound $\mathcal{L}_{PR}(\theta)$ can represent an inductive bias informed by a pretrained aligned, which can be more suited for early stages of training than tangent evidence lower bound (e.g., with zero gap). For a tangent lower bound, q in the Monte Carlo gradient estimate (e.g., by gradient descent) can be equal to the true posterior over alignments for the error mitigation system 100. Posterior regularization can seek to transfer the neural aligner's strong inductive biases to the AMR parser, which can have weaker inductive biases and thus can be potentially too flexible of a model. On the other hand, importance sampling trusts the AMR parser's inductive bias more, and can use the neural aligner as a surrogate distribution that can be adapted to more closely approximate the AMR parser's intractable posterior. In examples, if the posterior regularized variant outperforms the importance sampling variant, it can suggest that the StructBART is too flexible of a model.

In embodiments, the models can be evaluated on two datasets for AMR parsing in English. AMR2.0 contains about ~39 k sentences from multiple genres (LDC2017T10). AMR3.0 is a subset of AMR2.0 sentences with approx. 20 k new sentences (LDC2020T02), improved annotations with new fames, annotation corrections, and expanded annotation guidelines. Using AMR3.0 for evaluation can allow measuring of how well the alignment procedure generalizes to new datasets. Further, AMR3.0 can include new sentences but also new genres such as text from LORELEI, Aesop fables, and Wikipedia. The primary evaluation of the aligner is extrinsically through ARM parsing, and we additionally evaluate alignments directly against ground truth annotations. Moreover, the 130 sentences from the ARM2.0 train data (e.g., the most suited for SB-Align) can be examined, which can be labeled the gold test set. Alignment annotation are used for evaluation, and further, they are not used for aligner training.

With embodiments, the text tokens can be aligned to AMR nodes. As the AMR sentences do not include defector tokenization, the strings can be split on space and punctuation using one or more regex rules. For AMR parsing, the action set previously described in this application can be used. To accommodate the recurrent nature of the aligner, the AMR graph can be linearized during aligner training. Such conversion involves converting the graph into a tree and removing re-entrant edges.

Further, for AMR parsing, Smatch can be utilized. Moreover, for AMR alignment the goal can be to compare the new aligner with strong alignment baselines: SB-Align and LEAMR, a state-of-the-art alignment model. However, the aligner can predicts node-to-word alignments, SB-Align can predict node-to-span alignments, and the ground truth alignments can be subgraph-to-span. The mismatch in granularity can be addressed by measuring alignment performance using a permissive version of F1 after decomposing subgraph-to-span alignments into node-to-span alignments (e.g., a prediction is correct if it overlaps with the gold span). Such permissiveness can give advantages to the LEAMR and SB-Align baselines (which can predict span-based alignments) as there is no precision-related penalty for predicting large spans.

With examples, a bi-directional LSTM can be used for the text encoder and a uni-directional LSTM can be used for the AMR decoder. The input token embeddings can be derived from a pretrained character encoder and can be frozen throughout training. Such token embeddings can be tied with the output softmax, which can allow for alignment tokens not seen during training. The alignment model can otherwise be parameterized. Training can include a duration of about 200 epochs. Further, training can be unsupervised so that final checkpoint can be used.

In additional embodiments, the StructBART model can be used to fine-tuning for 100 epochs (AMR2.0) or 120 epochs (AMR3.0), and additionally Smatch can be used on the validation set for early stopping. For example, the hyperparameters of the AMR parser are not tuned so that it can be evaluated on how well the neural aligner (e.g., the generative alignment component 102) performed as a "plug-in" to an existing system. Experimental results on parsing for AMR2.0 and AMR3.0 test sets are reported in Table 1 wherein numbers are reported when using single alignments (MAP), posterior regularization (PR), and importance sampling (IS). Additionally, Table 1 includes a number of silver data training sentences used and the corresponding beam size. As can be seen from Table 1, PR and IS do not improve with beam search (numbers are omitted). The nomenclature "P" indicates using partial ensemble for the decoder, and "G" indicates using graph recategorization.

TABLE 1

Results on parsing for AMR2.0 and AMR3.0 test sets.

| Method | Beam Size | Silver Data | AMR2.0 | AMR3.0 |
|---|---|---|---|---|
| APT (Zhou et al., 2021a)[P] | 10 | 70k | 83.4 | — |
| TAMR (Xia et al., 2021)[G] | 8 | 1.8M | 84.2 | — |
| SPRING (Bevilacqua et al., 2021) | 5 | 200K | 84.3 | 83.0 |
| StructBART-S (Zhou et al., 2021b) | 10 | 90K | — | 82.7 ± 0.1 |
| StructBART-J (Zhou et al., 2021b) | 10 | 90K | 84.7 ± 0.1 | 82.6 ± 0.1 |
| StructBART-J + MBSE (Lee et al., 2021) | 10 | 219K | 85.7 ± 0.0 | 84.1 ± 0.1 |
| BARTAMR (Bai et al., 2022) | 5 | 200K | 85.4 | 84.2 |
| APT (Zhou et al., 2021a)[P] | 10 | — | 82.8 | 81.2 |
| SPRING (Bevilacqua et al., 2021) | 5 | — | 83.8 | 83.0 |
| SPRING (Bevilacqua et al., 2021)[G] | 5 | — | 84.5 | 80.2 |
| StructBART-J (Zhou et al., 2021b) | 10 | — | 84.2 ± 0.1 | 82.0 ± 0.0 |
| StructBART-S (Zhou et al., 2021b) | 10 | — | 84.0 ± 0.1 | 82.3 ± 0.0 |
| StructBART-S (reproduced) | 1 | — | 83.9 ± 0.0 | 81.9 ± 0.2 |
| +neural-aligner (MAP) | 1 | — | 84.0 ± 0.1 | 82.5 ± 0.1 |
| +neural-aligner (MAP) | 10 | — | 84.1 ± 0.0 | 82.7 ± 0.1 |
| +neural-aligner (PR, w/5 samples) | 1 | — | 84.3 ± 0.0 | 83.1 ± 0.1 |
| +neural-aligner (IS, w/5 samples) | 1 | — | 84.2 ± 0.1 | 82.8 |

With embodiments, SB-Align was developed prior to the AMR3.0 release, and because it incorporates a complex pipeline with domain-specific rules, it can be considered specialized for prior datasets like AMR2.0. As shown in Table 1, the aligner yields relatively stronger StructBART improvements for AMR3.0 than AMR2.0. This result and the relatively little manual configuration for the aligner (e.g., no rules, lemmatization, etc.) suggest the alignment approach generalizes better to different training corpora and that prior performance of StructBART on AMR3.0 can be affected by a lack of generalization. Graph re-categorization can be used in AMR parsing where groups of nodes are collapsed during training and test time but expanded during evaluation. The categorization can be harmful, by the results indicate that re-categorization is partially a function of alignment-like heuristics and the lower re-categorization results of SPRING in AMR3.0 reinforce the findings that alignments based on heuristic can be difficult to generalize.

In embodiments, the parsing performance can be improved by sampling 5 alignment per sentence in batch (see, e.g., Table 1). When looking at the sampling results compared with previous versions of StructBART trained on silver data, the error mitigation system 100 can outperform the benefit of simpler versions of data augmentation, such as simple self-learning.

Additionally, in further embodiments, training with posterior regularization or importance sampling uses the same number of samples, but in different ways. For example, in posterior regularization, the samples can be used to better approximate the posterior regularized objective, which in turn can regularize the AMR parser's posterior more effectively which can reduce the gradient estimator variance.

Further, in importance sampling, the samples can be used to better approximate the AMR parser's intractable log marginal likelihood. The importance sampling fails to improve upon posterior regularization for both AMR2.0 and AMR3.0, which can indicate that strong inductive biases associated the constrained aligner is a useful training signal for the flexible AMR parser.

The neural alignment method can be preferred over SB-Align due to relatively easy use (e.g., makes use of word embeddings, depends on less preprocessing, does not require domain specific rules, etc.) and can empirically improve performance (see, e.g., Table 1). To verify that improved parsing is due to better alignment, a comparison can be drawn against two strong alignment baselines (LEAMR and SB-Align) on an evaluation set of gold manually annotated alignments. Generally, a few hundred annotations can be available, and the goal can be to use such alignments on 10s or 100s of thousands of sentences for AMR parsing. For this reason, the aligners can be trained unsupervised with respect to alignment. Table 2 demonstrates results that show the neural aligner performs substantially better than SB-Align and the neural aligner is nearly performing the same as LEAMR (e.g., the current state of the art).

TABLE 2

Alignment Results Using Ground Truth Data.

| Alignment Models | AMR2.0 |
|---|---|
| LEAMR | 97.4 |
| SB-Align | 89.2 |
| Neural Aligner | 96.5 |
| IBM Model 1 | 77.2 |
| Neural Aligner w/o pretrained emb. | 79.8 |
| Neural Aligner w/pretrained emb. | 96.5 |

In embodiments, the count-based IBM model 1 can be trained using expectation maximization. Further, the neural aligner can be trained without pretrained character-aware embeddings. The neural aligner can learn the prior alignment distribution and the emission model conditions on the entire sentence w and the target history $v_{<s}$. Pretrained embeddings can be added to the model to recover the full model. The results in Table 2 indicate both flexibility and token representation outperform IBM Model 1. In examples, training with word vectors learned from scratch provides a small benefit compares to using pretrained character embeddings, which can yield about 20 point improvement in the permissive F1 metric.

FIG. 5 illustrates a flow diagram of an example, non-limiting computer-implemented method 500 that can facilitate mitigating the propagation of errors from the aligner training stage to the parser training in accordance with one or more embodiments described herein. Repetitive description of like elements and/or processes employed in respective embodiments is omitted for sake of brevity.

At 502, the computer-implemented method 500 can comprise computing, by a device operatively coupled to the processor 122 (e.g., the generative alignment component 102, the error propagation component 104, discriminative parser 106, stochastic oracle policy component 108, and/or the scaling component 110), a posterior distribution over one or more hard alignments of parts given a pair within a generative alignment.

At 504, the computer-implemented method 500 can comprise running, by the device (e.g., the generative alignment component 102, the error propagation component 104, discriminative parser 106, stochastic oracle policy component 108, and/or the scaling component 110), a stochastic oracle policy to train a discriminative parser 106.

At 506, the computer-implemented method 500, and/or step 504 can comprise sampling, by the device (e.g., the generative alignment component 102, the error propagation component 104, discriminative parser 106, stochastic oracle policy component 108, and/or the scaling component 110), the one or more hard alignments of parts from the posterior distribution.

At 508, the computer-implemented method 500, and/or step 504 can comprise running, by the device (e.g., the generative alignment component 102, the error propagation component 104, discriminative parser 106, stochastic oracle policy component 108, and/or the scaling component 110), a deterministic oracle policy on one or more samples of the one or more hard alignment of parts.

At 510, the computer-implemented method 500, and/or step 504 can comprise performing, by the device (e.g., the generative alignment component 102, the error propagation component 104, discriminative parser 106, stochastic oracle policy component 108, and/or the scaling component 110), a learning step on the discriminative parser 106.

At 512, the computer-implemented method 500, and/or step 504 can comprise applying, by the device (e.g., the generative alignment component 102, the error propagation component 104, discriminative parser 106, stochastic oracle policy component 108, and/or the scaling component 110), a scaling factor to average over the one or more samples. Further, the method 500 can additionally comprise incorporating an uncertainty of the one or more hard alignments of parts into training the discriminative parser 106. In embodiment, the method 500 can comprise exposing the discriminative parser 106 to bad alignments, and performing the learning step via a gradient descent.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively mitigate the prorogation of errors from the generative stage to the parser training stage as the one or more embodiments described herein can enable this process. And, neither can the human mind nor a human with pen and paper mitigate the propagation of errors from the generative stage to the parser training stage, as conducted by one or more embodiments described herein.

FIG. 6 illustrates a block diagram of an example, non-limiting operating environment 600 in which one or more embodiments described herein can be facilitated. FIG. 6 and the following discussion are intended to provide a general description of a suitable operating environment 600 in which one or more embodiments described herein at FIGS. 1-5 can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the inventive methods, such as neural aligner code 645. In addition to block 645, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 645, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 645 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in block 645 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
a processor that executes computer-executable components stored in a non-transitory computer-readable memory, wherein the computer-executable components comprise:
a generative aligner approximates samples from a posterior distribution, wherein the processor computes the posterior distribution over one or more hard alignments of parts given a pair within a generative aligner; and wherein the system comprises
a discriminative parser trained via a stochastic oracle policy component to reduce error propagation when combining the generative alignment component with the discriminative parser.

2. The system of claim 1, wherein the stochastic oracle policy component samples the one or more hard alignments of parts from the posterior distribution and runs a deterministic oracle policy on one or more samples of the one or more hard alignments of parts.

3. The system of claim 2, wherein the stochastic oracle policy component performs a learning step on the discriminative parser over one or more epochs.

4. The system of claim 3, wherein the learning step includes learning via gradient descent over one or more epochs.

5. The system of claim 3, wherein the processor further:
applies a scaling factor to average over the one or more samples.

6. The system of claim 1, wherein the discriminative parser is exposed to 6. one or more explanatory models.

7. The system of claim 1, wherein the discriminative parser and the generative alignment component are end-to-end systems.

8. A computer implemented method for reducing error propagation when combining generative aligners and transition-based aligners, the computer implemented method comprising:
computing, by a device operatively coupled to a processor, a posterior distribution over one or more hard alignments of parts given a pair within a generative alignment; and
running, by the device, a stochastic oracle policy to train a discriminative parser, further comprising:
sampling, by the device, the one or more hard alignments of parts from the posterior distribution;
running, by the device, a deterministic oracle policy on one or more samples of the one or more hard alignments of parts;
performing, by the device, a learning step on the discriminative parser; and
applying, by the device, a scaling factor to average over the one or more samples.

9. The computer implemented method of claim 8, wherein an uncertainty of the one or more hard alignments of parts is incorporated into training the discriminative parser.

10. The computer implemented method of claim 8, further comprising:
exposing the discriminative parser to one or more explanatory models.

11. The computer implemented method of claim 8, wherein running the stochastic oracle policy prevents over-fitting the discriminative parser to bad alignments.

12. The computer implemented method of claim 8, wherein the learning step is performed via gradient descent.

13. The computer implemented method of claim 8, further comprising:
transferring embedding-level knowledge from the generative alignment into speech embeddings.

14. The computer implemented method of claim 8, wherein the pair includes a natural language portion and a formal representation portion associated with an input sentence.

15. A computer program product for reducing error propagation when combining generative aligners and transition-based aligners, the computer program product comprising a non-transitory computer readable memory having program instructions embodied therewith, the program instructions executable by a processor to cause the processor to:
compute a posterior distribution over one or more hard alignments of parts given a pair within a generative alignment, wherein the generative alignment is relative to approximate samples from a posterior distribution; and
run a stochastic oracle policy to train a discriminative parser,
wherein an uncertainty of alignment of the generative alignment is incorporated into training the discriminative parser.

16. The computer program product of claim 15, wherein the program instructions are further executable to cause the processor to:
sample the one or more hard alignments of parts from the posterior distribution;
run a deterministic oracle policy on one or more samples of the one or more hard alignments of parts;
perform a learning step on the discriminative parser; and
apply a scaling factor to average over the one or more samples.

17. The computer program product of claim 16, wherein the program instructions are further executable to cause the processor to:
expose the discriminative parser to one or more explanatory models.

18. The computer program product of claim 16, wherein the program instructions are further executable to cause the processor to:
prevent over-fitting of the discriminative parser to bad alignments via the stochastic oracle policy.

19. The computer program product of claim 16, wherein the program instructions are further executable to cause the processor to:
perform the learning step via gradient descent.

20. The computer program product of claim 16, wherein the program instructions are further executable to cause the processor to:
transfer embedding-level knowledge from the generative alignment into speech embeddings.

* * * * *